UNITED STATES PATENT OFFICE.

WALTER K. ROGERS, OF FOREST HILL, MARYLAND, ASSIGNOR, BY DIRECT AND MESNE ASSIGNMENTS, OF TWO-NINTHS TO WALTER E. TUCKER AND TWO-NINTHS TO HENRY RIGDON, BOTH OF FOREST HILL, MARYLAND, AND ONE-THIRD TO CLARENCE B. WHITAKER, OF SAN FRANCISCO, CALIFORNIA.

PROCESS OF REMOVING CARBON FROM GAS-ENGINE CYLINDERS.

1,205,264.     Specification of Letters Patent.     Patented Nov. 21, 1916.

No Drawing.     Application filed July 23, 1915. Serial No. 41,537.

*To all whom it may concern:*

Be it known that I, WALTER K. ROGERS, a citizen of the United States, residing at Forest Hill, in the county of Harford and State of Maryland, have invented certain new and useful Improvements in Processes of Removing Carbon from Gas-Engine Cylinders, of which the following is a specification.

This invention relates to a process of and composition of matter for removing deposits of carbon commonly occurring on the inner walls of the cylinders of internal combustion engines, and has for one of its objects the production of a composition for this purpose which contains no acid or other ingredient having a deleterious effect upon the metal parts of the engine.

Another object of the invention is to produce such a composition as may be used effectively when the cylinders are either hot or cold.

Still another object of the invention is to produce a carbon-removing composition which will be entirely free from water or water-containing ingredients, so that the use of the novel composition will entail no difficulty in starting the motor immediately after its application.

Many preparations have been heretofore proposed for the purpose of removing carbon from metallic surfaces, but practically all of them have disadvantages which frequently render their use undesirable. For instance, many contain acids which, as is well-known in the art, have a deleterious effect upon machined or polished metal surfaces; while others contain water in such quantities as to render starting of a gas-engine immediately after removal of carbon therefrom practically impossible, as the explosion-chambers and contiguous parts must be entirely free from moisture before the engine can, under ordinary circumstances, be operated. Liability of water to work its way to the valves, the carbureter and into the gasolene is not to be disregarded.

The composition of the present invention, which in its use avoids the difficulties encountered in the use of preparations heretofore proposed, consists of alcohol, preferably wood alcohol, in which is absorbed ammonia gas in varying quantities depending upon the strength desired of the final product. The richer the product in ammonia, the quicker the action of the substance in its removal of carbon; but since the cost of production increases with the amount of ammonia absorbed, it may in some cases be preferable to keep the percentage of ammonia used comparatively low, and allow the composition a little more time to work during its action on the carbon. It has been found by experiment that as low as 10% by weight of the absorbed ammonia will give a product quite satisfactory for general application, but it will be understood that this amount may be considerably increased if it is desired to hasten the scavenging operation, without departing from the scope of the invention.

The preparation of the substance is accomplished under sufficient pressure to insure absorption of the ammonia gas by the alcohol, but no special apparatus is required in the procedure. If desirable, a small quantity of some harmless coloring matter may be added, but such is of course not essential.

In use, a small portion of the substance is squirted into the cylinder, *e. g.* through the spark-plug opening, onto the walls, etc., of the cylinder. The motor may, at this time, be either hot or cold, but the composition appears to operate a little quicker and better if the cylinder is hot. The deposits of carbon are immediately dislodged, the carbon peeling off in a somewhat flaky condition, when it can be readily carried out through the exhaust upon operation of the engine.

The composition of the invention is not only surprisingly effective, but is inexpensive to manufacture, easy and safe to handle, and requires no long periods of idleness of the engine.

I claim:—

1. The process of removing carbon deposits from gas engine cylinders, which consists in introducing into the cylinder a composition of matter consisting of wood alcohol and ammonia.

2. The process of removing carbon deposits from gas engine cylinders, which consists in introducing into the cylinder a composition of matter consisting of alcohol and ammonia.

3. The process of removing carbon deposits from gas engine cylinders, which consists in introducing into the cylinder a composition of matter consisting of a substantially water-free mixture of alcohol and ammonia.

4. The process of removing carbon deposits from gas engine cylinders, which consists in introducing into the walls of the cylinder a composition of matter consisting of a substantially water-free mixture of wood alcohol and ammonia.

5. The process of cleansing carbon from gas-engine cylinders which consists in introducing into the cylinder alcohol which has had ammonia gas absorbed therein.

In testimony whereof I affix my signature in presence of two witnesses.

WALTER K. ROGERS.

Witnesses:
 WALTER E. TUCKER,
 EUGENE TUCKER.